United States Patent Office 3,130,926
Patented Apr. 28, 1964

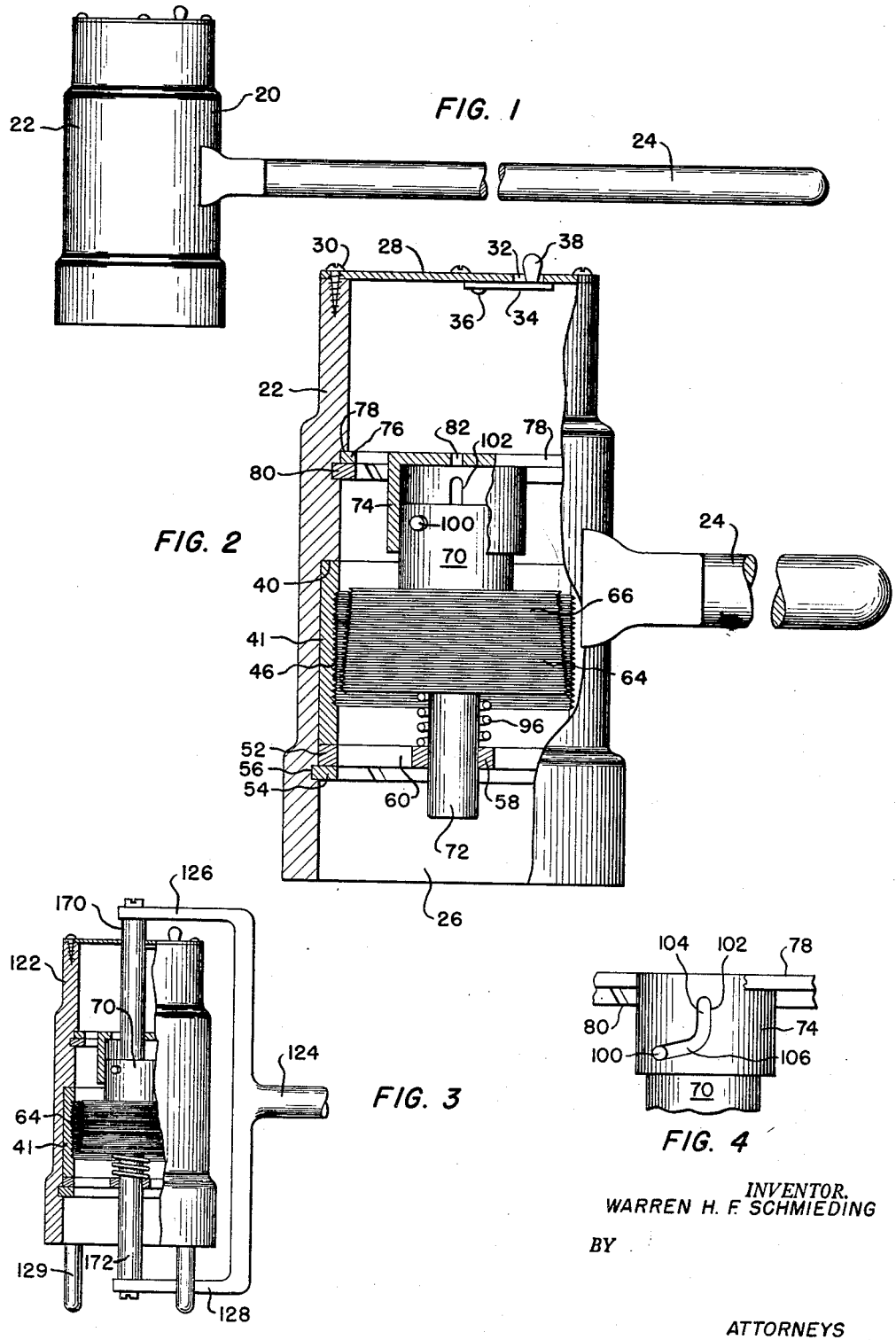

3,130,926
PEPPER-CORN GRINDER
Warren H. F. Schmieding, 4909 Vista Arroyo,
La Mesa, Calif.
Filed Apr. 17, 1961, Ser. No. 104,199
3 Claims. (Cl. 241—168)

The present invention relates to a pepper shaker and more particularly to the type of shaker which is caused to function as a pepper-corn grinder merely shaking the same. The present application is a continuation-in-part of my co-pending application Serial No. 689,573, filed October 11, 1957, and now abandoned.

The pepper shaker of the present invention comprises a unit including a casing for holding the pepper-corns to be ground. The casing is provided with an opening in the bottom thereof through which the ground pepper is discharged. Cooperating grinding elements are disposed within the casing, one thereof being movable relative to the other. Mechanism is provided for causing relative movement of the grinding elements by merely reciprocating the grinding unit.

More specifically, one of the grinding elements is moved vertically or vertically and spirally relative to another. One of these grinding elements is inclined relative to the other and so positioned with respect to one another as to cause grinding of the pepper-corns as the surface of the moving element is moved relative to a confronting surface of the other element.

In the drawings:

FIG. 1 is a side view of the pepper-corn grinder;

FIG. 2 is a longitudinal sectional view of the unit shown in FIG. 1 but on a larger scale;

FIG. 3 is a view partly in section showing another form of the invention; and

FIG. 4 is a fragmentary view of the parts which cause spiral movement to be imparted to one of the grinding elements when the grinder is reciprocated.

Referring more in detail to the drawing the pepper unit 20 includes a casing for containing whole pepper-corns. Preferably the unit also includes a handle 24 for manipulating the unit. The bottom of the casing is open at at 26 for the discharge of ground pepper. The top of the casing is provided with a removable cover 28 which may be held in place in any suitable manner as by screws 30. The cover is provided with an inlet opening 32 through which the pepper-corns are poured into the interior of the casing. A sub-cover 34 is pivoted at 36 and is disposed within the casing. This sub-cover can be moved by handle 38 to close the opening 32.

A circular ledge 40 is provided on the interior of the casing 22, and forms a downwardly extending abutment or shoulder for a stationary grinding element 41. This grinding element 41 is arcuate and preferably circularly shaped, and the inner surface thereof is provided with grinding teeth 46, similar to the teeth of a file. The grinding element 41 is held in position by a plate 52 therebelow, and this plate is held in position by a split ring 54. This split ring 54 extends within a groove 56 within the casing 22. The plate 52 provides a central bearing 58 which is surrounded by passages 60, the passages permitting the flow of ground pepper through the plate.

A relatively movable grinding element 64 is disposed within the grinding element 41. It too is arcuate and preferably circularly shaped in cross-section, so as to complement the grinding element 41. The grinding element 64 is also provided with teeth 66 similar to those on the element 41. One of these grinding elements is tapered relative to the other, and preferably the grinding element 64 is frustro conically shaped.

Grinding element 64 is adapted to be reciprocated vertically relative to the grinding element 41. The element 66 is guided by an upper shaft 70 and a lower shaft 72. These shafts are permanently attached to the grinding element 66. The shaft 72 is guided by bearing 58. Shaft 70 is guided by an inverted cup-shaped element 74. Preferably the shafts 70 and 72 and the cup-shaped element 74 are circular in cross-section. The inverted base 76 of the cup-shaped element 74 abuts a downwardly extending shoulder formed internally of the casing 22 and is held in place by a split ring 80. A restricting orifice 82 is formed in the base 76, of the guide 74, to permit the limited escape of air from the cup 74 as the unit is being moved downwardly. Thus the air in the cup 74 functions as a pneumatic brake for resiliently limiting the relative movement between the casing 22 and the grinding element 64. A spring 96 is interposed between the guide 58 and the lower part of the grinding element 64 and about the shaft 72, to resiliently limit the relative movement between the casing 22 and the grinding element 64.

It is apparent from the foregoing that a vertical shaking movement is imparted to the unit 20, due to the mass of the grinding element and the shafts therefore; the grinding element 64 will lag with respect to the grinding element 41 and thereby cause the grinding action to be imparted between the teeth 46 and 66. The resultant ground pepper will fall through the casing and out the lower opening 26.

If desirable, a relative twisting movement may be imparted between the grinding teeth 46 and the grinding teeth 66. This is accomplished by a plurality of pins, one of which is shown at 100 and grooves 102. The pins can be either secured on the shaft 70 or in the cup 74, and the grooves 102 will be formed in the other of the two elements.

Two pins and two grooves are here employed. These pins are disposed 180 degrees from ones another and likewise the grooves are also so disposed. Each of these grooves is provided with straight vertically extending portions 104 which merge into downwardly extending spiral portions 106.

At the first part of the quick upward movement of the casing 22, the weighted grinding element 64, including the shafts 70 and 72 wil lag with respect to the casing 22 and grinding element 41, there being no resistance offered by the pins 100. However, when the walls of the spiral portions 106 engage the pins, a sudden twisting movement is imparted to the shaft 70 and grinding element 64 relative to the grinding element 41. This sudden twisting movement, together with the raising of the grinding element 41, causes ready crushing of the hard pepper-corns. This sudden relative twisting movement enhances the crushing function of the cooperating grinding elements.

Referring now to the embodiment shown in FIG. 3, the structure is the same as that of FIGS. 1 and 2 expecting that the handle 124 is directly connected to the grinding element 64 instead of being directly connected to the casing 22, and the legs 129 extend below the casing 122 for supporting the unit independently of the handle 124. In this embodiment the handle is bifurcated and the opposite tines 126 and 128 thereof are connected to opposite ends of shafts 170 and 172. In this embodiment the shaft 170 is a continuation of shaft 70 and shaft 172 is similar to shaft 72 but is somewhat longer.

Obviously, from this embodiment, it will be seen that as the handle 124 is reciprocated vertically, together with the assembly of the shafts 170 and 70, grinder 64 and shaft 172, the rest of the unit including the grinding element 41 will lag in its reciprocating movement between grinding element 64 and grinding element 41, resulting in the crushing and grinding of the pepper-corns. Obviously also, the twisting as well as the vertical movement can be imparted to the casing 122 and the grinding element 41 by providing the pins 100 in cooperation with the grooves 102.

The present invention is particularly useful for sprinkling freshly ground pepper over meats which are being broiled above a fire, such as a charcoal fire, since the attendant need not place his hand or hands above the hot fire, but his hand may be to the side of the fire. By merely shaking the unit vertically, by the handle, the pepper-corns will be ground and will be sprinkled over the meats.

While the forms of embodiments herein shown and described constitute preferred forms, it is to be understood that other forms may be adapted falling within the scope of the claims that follow.

I claim:

1. A pepper-corn grinder unit comprising a casing for pepper-corns, said casing having an inlet and outlet at the upper and lower portions thereof, cover means for said inlet means, perforated upper plate means in engagement with the inner surface of said casing and positioned therein in transverse relationship thereto, perforated lower plate means in engagement with the lower surface of said casing and positioned in transverse relationship thereto, hollow grinding means fixed within said casing between said upper and lower plates, the hollow grinding means being circular with the axis thereof extending substantially vertically, the grinding surface of said grinding means being the free circular inner surface thereof; circular second grinding means mounted within said casing in vertically movable relationship therewith, the grinding surface of said second grinding means being complementary with and in cooperative grinding relationship with the grinding surface of said first grinding means, substantially vertically extending shaft means extending from the opposite ends of said second grinding means in axial alignment with one another, each of said shaft means being received in said upper and lower plate means respectively, and being substantially vertically movable with respect thereto, and means associated with each of said shaft means for resilient relative movement between said movable grinding means of said fixed grinding means, said last means resiliently limiting movement of said movable means in either direction.

2. A pepper shaker unit comprising a means forming a casing for pepper-corn; a grinding element in the casing; a grinding element cooperating with the first mentioned grinding element for grinding pepper-corn, said second mentioned grinding element being disposed within the casing, one of said grinding elements being movable vertically, within certain limits relative to the other element when vertically shaking movement is imparted to the unit; a guide for said movable element for positively causing spiral movement to be imparted to said movable element for at least a part of the vertical movement thereof between said limits when vertical shaking movement is imparted to said unit.

3. A pepper unit comprising a casing for pepper-corn; a grinding element in the casing; a second grinding element within the casing and movable vertically, within certain limits, when vertical shaking movement is imparted to said unit; a guide for the second mentioned grinding element having a substantially vertically extending grinding portion for limiting the relative movement of said elements to vertical movement throughout a portion of the vertical limits of movement of said grinding elements toward one another and having a spiral portion merging with the vertical grinding portion for positively guiding said movable element spirally as the grinding elements approach closer to one another when vertical shaking movement is imparted to said unit.

References Cited in the file of this patent

UNITED STATES PATENTS

| | | |
|---|---|---|
| 597,077 | Ackermann | Jan. 11, 1898 |
| 632,044 | Chapman | Aug. 29, 1899 |
| 1,757,297 | Dinsmoor | May 6, 1930 |
| 1,931,089 | Schwarz et al. | Oct. 17, 1933 |
| 1,970,891 | King | Aug. 21, 1934 |
| 2,545,240 | Patoe | Mar. 13, 1951 |
| 2,679,360 | Arni | May 25, 1954 |
| 2,782,998 | Hastings | Feb. 26, 1957 |

FOREIGN PATENTS

| | | |
|---|---|---|
| 172,689 | Germany | June 29, 1906 |
| 281,062 | Great Britain | Dec. 1, 1927 |